US012592092B2

(12) United States Patent
    Behravesh

(10) Patent No.: US 12,592,092 B2
(45) Date of Patent: Mar. 31, 2026

(54) APPARATUS AND METHOD FOR DETERRING A THIRD PARTY FROM COPYING A PRODUCT OR PROCESS

(71) Applicant: AGILENT TECHNOLOGIES, INC., Santa Clara, CA (US)

(72) Inventor: Arash Behravesh, Arlington, VA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 715 days.

(21) Appl. No.: 17/877,446

(22) Filed: Jul. 29, 2022

(65) Prior Publication Data

US 2024/0037968 A1    Feb. 1, 2024

(51) Int. Cl.
    G06V 20/00        (2022.01)
    G06K 7/14         (2006.01)
    G06V 10/74        (2022.01)
    G06V 30/19        (2022.01)

(52) U.S. Cl.
    CPC ........... G06V 20/95 (2022.01); G06K 7/1417 (2013.01); G06K 7/1439 (2013.01); G06V 10/74 (2022.01); G06V 30/19007 (2022.01); G06V 2201/09 (2022.01)

(58) Field of Classification Search
    CPC .. G06V 20/95; G06V 30/19007; G06V 10/74; G06V 2201/09; G06K 7/1417; G06K 7/1439
    See application file for complete search history.

(56) References Cited

U.S. PATENT DOCUMENTS

| | | | |
|---|---|---|---|
| 6,942,151 B2 | 9/2005 | Ehrhart | |
| 8,392,969 B1* | 3/2013 | Park ........................ | G06Q 10/00 |
| | | | 726/8 |
| 8,976,030 B2 | 3/2015 | Cunningham et al. | |
| 9,069,069 B2 | 6/2015 | Freund et al. | |
| 9,594,993 B2 | 3/2017 | Picard et al. | |
| 10,062,022 B2 | 8/2018 | Tanaka et al. | |
| 10,201,939 B1* | 2/2019 | Pare ........................ | G05B 15/02 |
| 2016/0027042 A1* | 1/2016 | Heeter ............... | G06Q 30/0248 |
| | | | 705/14.47 |
| 2017/0032382 A1* | 2/2017 | Shulman ............ | G06K 7/10861 |
| 2017/0262680 A1* | 9/2017 | Voigt ...................... | G06F 18/23 |
| 2019/0116176 A1* | 4/2019 | Vaysman ............ | H04L 63/0853 |
| 2019/0147458 A1* | 5/2019 | Simske ................. | H04L 63/083 |
| | | | 705/318 |
| 2019/0228141 A1* | 7/2019 | Shimizu ................. | G07B 15/00 |
| 2020/0151738 A1* | 5/2020 | Guinard ............ | G06Q 30/0185 |
| 2020/0285825 A1* | 9/2020 | Smith .................... | G06V 10/25 |
| 2021/0174378 A1* | 6/2021 | Rahimizad ......... | G06Q 20/3672 |

(Continued)

FOREIGN PATENT DOCUMENTS

| | | | | |
|---|---|---|---|---|
| EP | 2644461 A1 * | 10/2013 | ........... | H04L 9/3236 |
| JP | 06006652 B2 | 10/2016 | | |
| WO | 2019072082 A1 | 4/2019 | | |

*Primary Examiner* — Utpal D Shah

(57)                ABSTRACT

In some examples, deterring a third party from copying a product or process may include scanning code to generate scanned code. Text in the scanned code may be read and/or at least one image in the scanned code may be recognized. The text and/or the at least one image may be analyzed to determine whether the code includes a specified trademark. Based on a determination that the code includes the specified trademark, an indication of authenticity of the code may be generated.

22 Claims, 10 Drawing Sheets

(56) References Cited

U.S. PATENT DOCUMENTS

| | | | |
|---|---|---|---|
| 2021/0314316 A1* | 10/2021 | Ross | G06F 18/22 |
| 2023/0065074 A1* | 3/2023 | Rafferty | G06V 30/1444 |
| 2023/0306217 A1* | 9/2023 | Anand | G09F 3/0297 |
| 2024/0029105 A1* | 1/2024 | Heeter | G06Q 30/018 |
| 2024/0127266 A1* | 4/2024 | Nathani | G06V 40/50 |
| 2024/0231387 A1* | 7/2024 | Taniguchi | G05D 1/2465 |
| 2025/0203672 A1* | 6/2025 | Narasimha | H04W 74/006 |

* cited by examiner

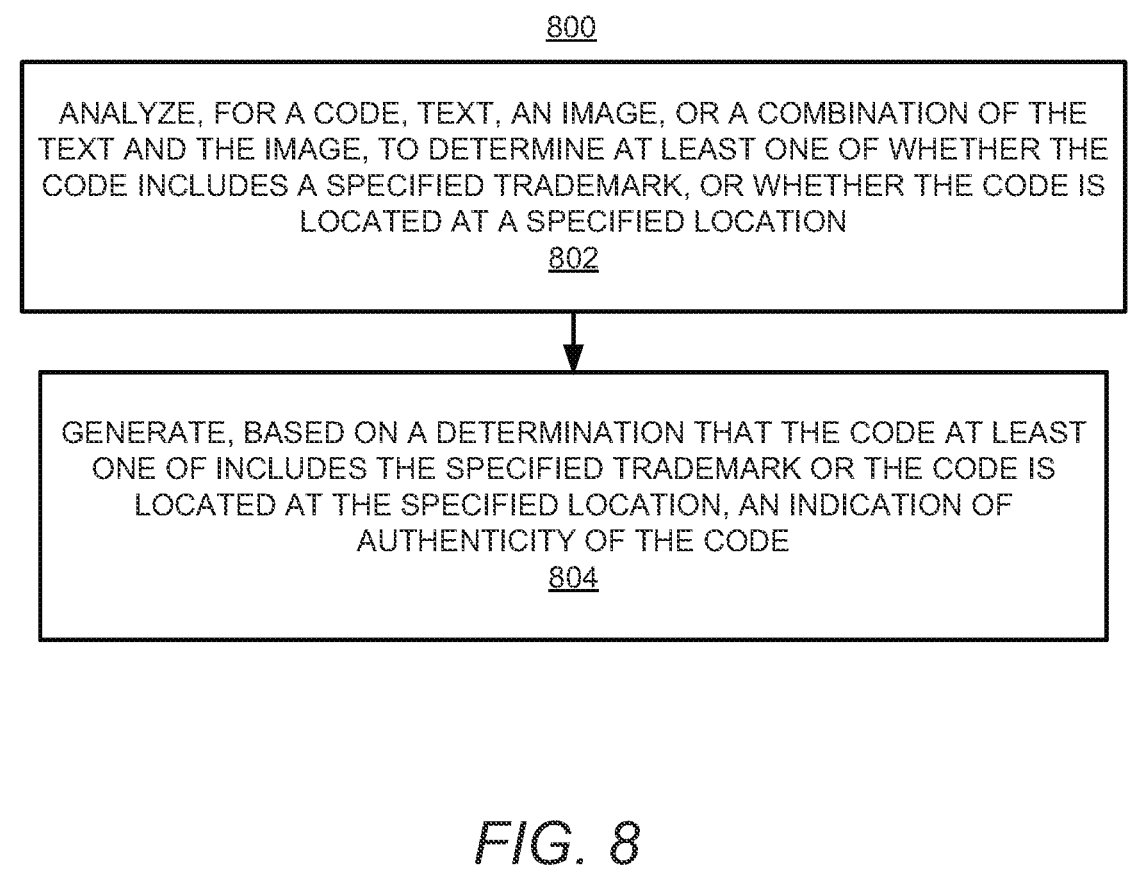

800

ANALYZE, FOR A CODE, TEXT, AN IMAGE, OR A COMBINATION OF THE TEXT AND THE IMAGE, TO DETERMINE AT LEAST ONE OF WHETHER THE CODE INCLUDES A SPECIFIED TRADEMARK, OR WHETHER THE CODE IS LOCATED AT A SPECIFIED LOCATION
802

GENERATE, BASED ON A DETERMINATION THAT THE CODE AT LEAST ONE OF INCLUDES THE SPECIFIED TRADEMARK OR THE CODE IS LOCATED AT THE SPECIFIED LOCATION, AN INDICATION OF AUTHENTICITY OF THE CODE
804

*FIG. 8*

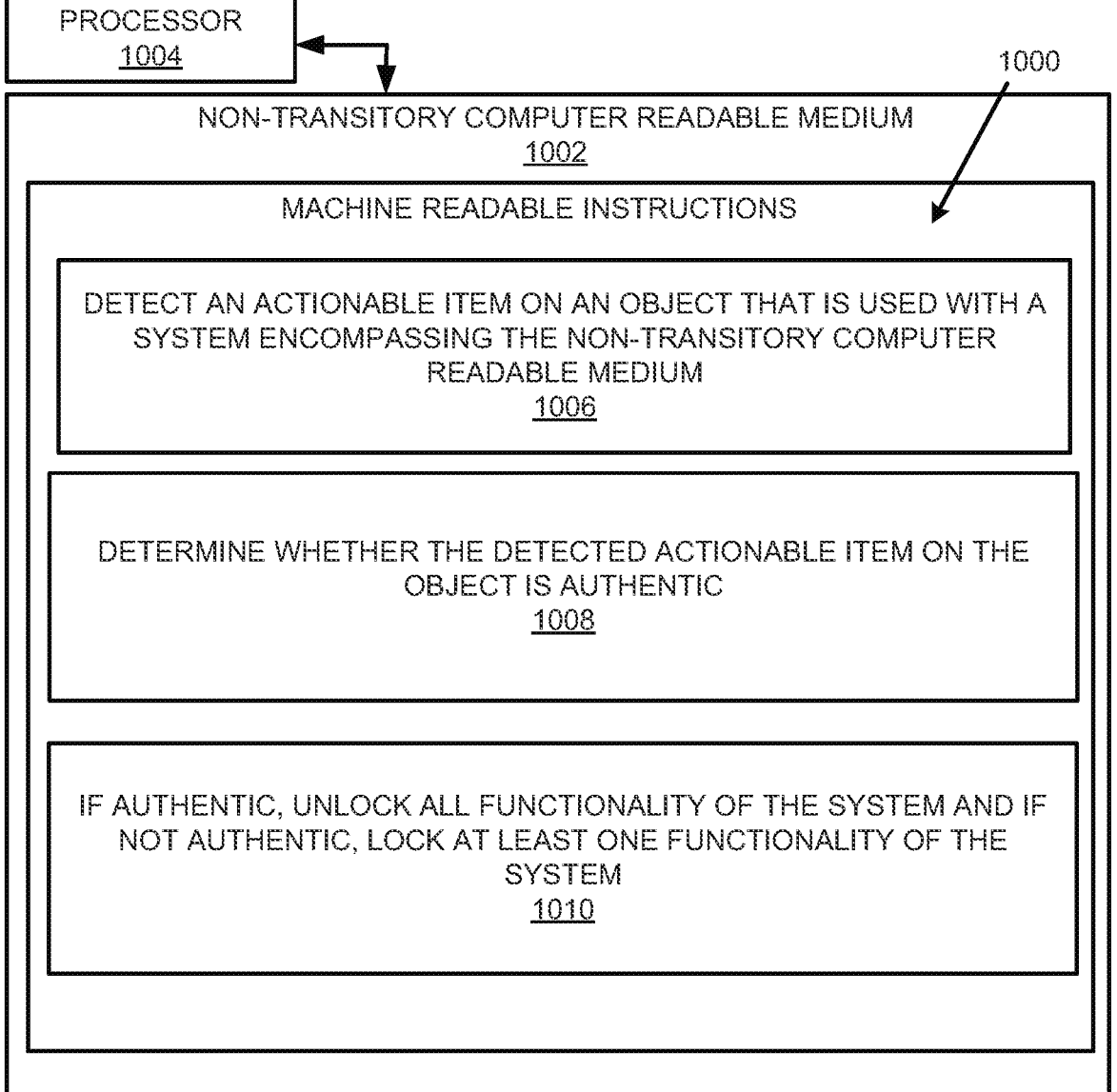

PROCESSOR
1004

1000

NON-TRANSITORY COMPUTER READABLE MEDIUM
1002

MACHINE READABLE INSTRUCTIONS

DETECT AN ACTIONABLE ITEM ON AN OBJECT THAT IS USED WITH A
SYSTEM ENCOMPASSING THE NON-TRANSITORY COMPUTER
READABLE MEDIUM
1006

DETERMINE WHETHER THE DETECTED ACTIONABLE ITEM ON THE
OBJECT IS AUTHENTIC
1008

IF AUTHENTIC, UNLOCK ALL FUNCTIONALITY OF THE SYSTEM AND IF
NOT AUTHENTIC, LOCK AT LEAST ONE FUNCTIONALITY OF THE
SYSTEM
1010

*FIG. 10*

APPARATUS AND METHOD FOR DETERRING A THIRD PARTY FROM COPYING A PRODUCT OR PROCESS

BACKGROUND

A product or process may be designed, owned, or produced by an entity that may thus control various factors related to the product or process. For example, the entity may control factors such as use, marketing, manufacturing, distribution, etc., of the product or process. In this regard, a variety of techniques may be utilized to deter a third party from unauthorized copying or use of such a product or process.

BRIEF DESCRIPTION OF DRAWINGS

Features of the present disclosure are illustrated by way of example and not limited in the following figure(s), in which like numerals indicate like elements, in which:

FIG. 8 illustrates a flowchart of an example method for deterring a third party from copying a product or process, in accordance with an example of the present disclosure;

FIG. 10 illustrates a further example block diagram for deterring a third party from copying a product or process, in accordance with another example of the present disclosure.

DETAILED DESCRIPTION

Figure 1:
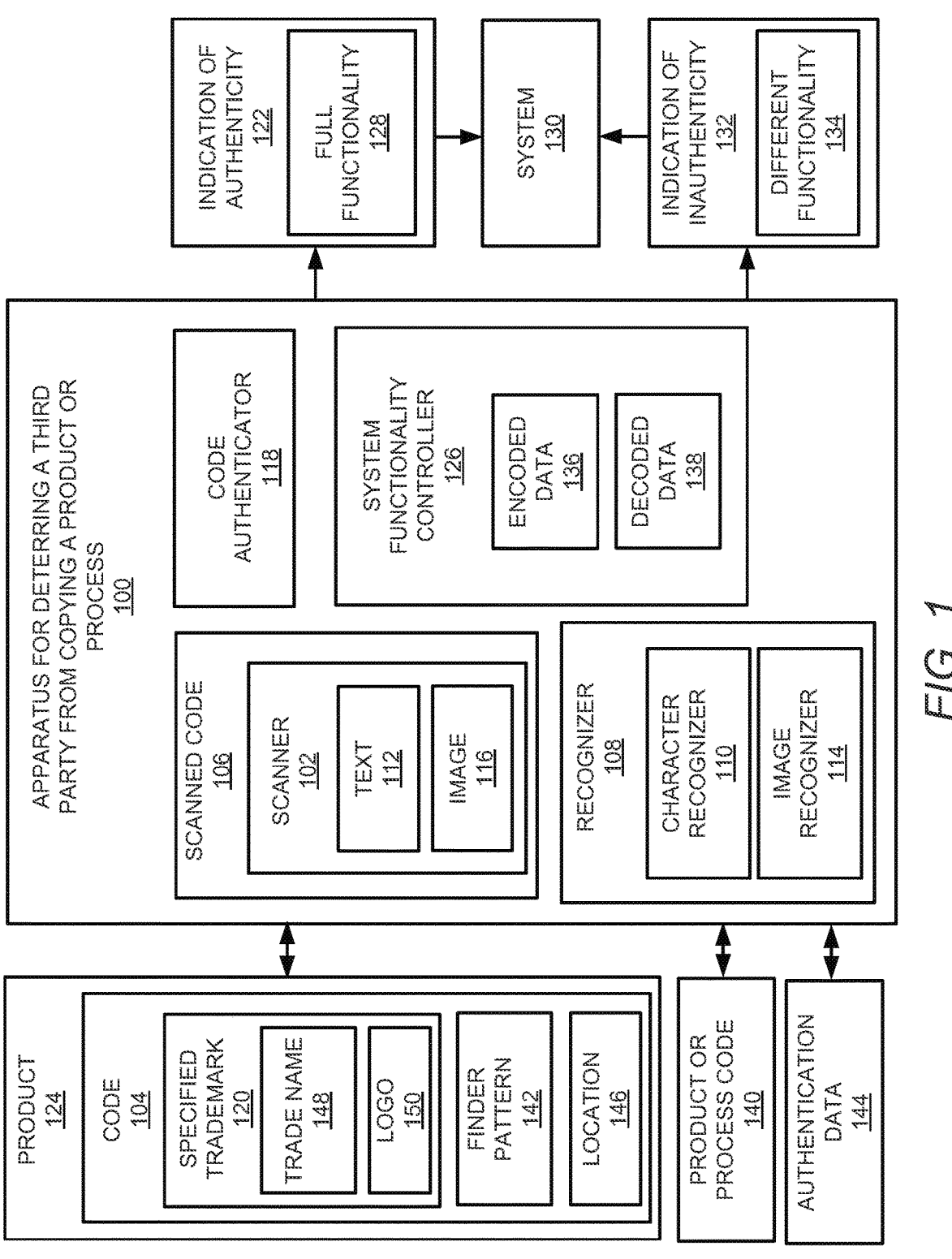
FIG. 1 illustrates a layout of an apparatus for deterring a third party from copying a product or process, in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Apparatuses for deterring a third party from copying a product or process, methods for deterring a third party from copying a product or process, and non-transitory computer readable media having stored thereon machine readable instructions to deter a third party from copying a product or process are disclosed herein.

With respect to a product or process that is owned or use of which is otherwise controlled by an entity, a variety of techniques may be utilized to deter a third party from unauthorized copying or use of such a product or process. Despite implementation of such techniques, in some cases, a counterfeit product or process may be knowingly or unknowingly utilized by a third party in place of an authorized product or process. In this regard, it is technically challenging to legally and/or technically deter a third party from unauthorized copying or use of such a product or process.

The apparatuses, methods, and non-transitory computer readable media address the aforementioned legal and technical challenges by implementing, for example, optical character recognition (OCR) and other types of image recognition technologies to read text in code that at scanned from a product, and recognize at least one image in the scanned code. The text and/or the at least one image may be analyzed to determine whether the code includes a specified trademark. The specified trademark may be a word mark and/or a logo associated with the product or a process associated with the product.

Based on a determination that the code includes the specified trademark, an indication of authenticity of the code may be generated. Based on the indication of authenticity of the code, full functionality of a system associated with the code may be authorized. In this regard, the full functionality of the system may include step-by-step instructions to control the system, where the instructions are specific to the system, and/or usage of the product or associated process. The full functionality of the system may also include a further code and/or password to permit a specific operational capability of the system, for example, by unlocking a specific functionality of the system.

Alternatively, based on a determination that the code does not include the specified trademark, an indication of inauthenticity of the code may be generated. In this regard, based on the indication of inauthenticity of the code, different functionality of the system associated with the code may be authorized. The different functionality may include reduced functionality or no functionality. For example, the different functionality of the system may include limited or no instructions with respect to the system and/or the product or associated process. The limited or no instructions may also include restrictions on any type of a further code and/or password that is needed to permit a specific operational capability of the system, for example, to unlock a specific functionality of the system.

The indication of inauthenticity of the code may provide a legal deterrence for a third party from unauthorized copying or use of a product or process. Similarly, the authorization of the different functionality of the system associated with the code may provide a technical deterrence for a third party from unauthorized copying or use of a product or process. Thus, these and other factors as disclosed herein may provide a legal and a technically deterrence for a third party from unauthorized copying or use of a product or process.

According to examples disclosed herein, the apparatuses, methods, and non-transitory computer readable media disclosed herein may be implemented in a hand-held device such as a smart phone, a handheld computer, or another such portable or non-portable device.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example apparatus for deterring a third party from copying a product or process (hereinafter also referred to as "apparatus 100" or "authentication apparatus").

Referring to FIG. 1, the apparatus 100 may include a scanner 102 to scan code 104 to generate scanned code 106. The code 104 may be or may include protected intellectual property, an actionable item, a trademark, a picture/logo, a word (e.g., text and/or symbols), a number, or any combination thereof. The terms "protected intellectual property", "actionable item", and "trademark" may be used interchangeable herein. However, one skilled in the art would appreciate in view of this disclosure that the description and the claims are not limited to only trademarks. Generally, an actionable item or protected intellectual property may include any item or intellectual property that may be used to pursue legal action, such as intellectual property infringement, for example, a trademark, a patent, and/or a copyright infringement action.

A recognizer 108, which may be a character recognizer 110, may read text 112 in the scanned code 106. Alternatively, the recognizer 108 may be an image recognizer 114 to recognize at least one image 116 in the scanned code 106. Alternatively, the recognizer 108 may be the character recognizer 110 and the image recognizer 114. The recognizer 108 may implement, for example, OCR and other types of image recognition technologies to respectively read the text 112 in the scanned code 106 and recognize the at least one image 116 in the scanned code 106.

A code authenticator 118 that is executed by at least one hardware processor (e.g., the hardware processor 702 of FIG. 7, the hardware processor 904 of FIG. 9, and/or the hardware processor 1004 of FIG. 10) may analyze, from the recognizer 108, the text 112 and/or the at least one image 116 to determine whether the code 104 includes an actionable item or a protected intellectual property, such as a specified trademark 120. For example, the specified trademark 120 may be a word mark "ABCD" (e.g., trade name) associated with a product or process. Alternatively or additionally, the specified trademark 120 may be a logo associated with a product or process. The logo may include a symbol or other design adopted to identify the product 124. The code authenticator 118 may generate, based on a determination that the code 104 includes the specified trademark 120, an indication of authenticity 122 of the code 104.

According to examples disclosed herein, the code 104 may include information associated with a product 124 or a process (e.g., how to utilize the product 124). In one example, the product 124 may include a vessel, such as a dissolution vessel, that may be utilized as part of a dissolution test apparatus to measure the extent and rate of solution formation from a specified dosage. In other examples, the product 124 may include any type of product that may be labeled or otherwise manufactured to include the code 104. Yet further, the product 124 may include any type of written, graphical, or another type of display or material that may be labeled or otherwise manufactured to include the code 104.

A system functionality controller 126 that is executed by at least one hardware processor (e.g., the hardware processor 702 of FIG. 7, the hardware processor 904 of FIG. 9, and/or the hardware processor 1004 of FIG. 10) may authorize, based on the indication of authenticity 122 of the code 104, full functionality 128 of a system 130 associated with the code 104. For the example of the product 124 that may include a vessel, such as a dissolution vessel, the system 130 may include a dissolution test apparatus to measure the extent and rate of solution formation from a specified dosage. In this regard, the full functionality 128 of the system 130 may include automatically generating a summary table, automatically generating step-by-step instructions to control the system 130, where the instructions are specific to the system 130, and/or a type and/or size of the dissolution vessel for performing a specific type of dissolution test. The full functionality 128 of the system 130 may also include a further code and/or password to permit a specific operational capability of the system 130, for example, by unlocking a specific functionality of the system 130.

According to examples disclosed herein, the code authenticator 118 may generate, based on a determination that the code 104 does not include the specified trademark 120, an indication of inauthenticity 132 of the code 104. In this regard, the system functionality controller 126 may authorize, based on the indication of inauthenticity 132 of the code 104, different functionality 134 of the system 130 associated with the code 104.

According to examples disclosed herein, the different functionality 134 may include reduced functionality or no functionality. For the example of the product 124 that may include a vessel, such as a dissolution vessel, the different functionality 134 of the system 130 may include limited or no instructions with respect to the system 130, such as not generating a summary table, and/or the dissolution vessel for performing a dissolution test. The limited or no instructions may also include restrictions on any type of a further code and/or password that is needed to permit a specific operational capability of the system 130, for example, to unlock a specific functionality of the system 130.

According to examples disclosed herein, the code authenticator 118 may generate, based on a determination that the code 104 does not include the specified trademark 120, an indication of inauthenticity 132 of the code 104. In this regard, the indication of inauthenticity 132 may include a sound and/or a visual alert.

According to examples disclosed herein, the system functionality controller 126 may authorize, based on the indication of authenticity 122 of the code 104, the full functionality 128 of the system 130 associated with the code 104 by decoding, based on the indication of authenticity 122 of the code 104, encoded data 136 from the code 104 to generate decoded data 138. Further, the system functionality controller 126 may transmit and/or display the decoded data 138 to provide the full functionality 128 of the system 130 associated with the code 104. For the example of the product 124 that may include a vessel, such as a dissolution vessel, the decoded data 138 may include step-by-step instructions that are specific to the system 130, and/or a type and/or size of the dissolution vessel for performing a specific type of dissolution test.

According to examples disclosed herein, the system functionality controller 126 may determine whether the decoded data 138 matches a specified product or process code of a plurality of product or process codes 140. The system functionality controller 126 may transmit or display, based on a determination that the decoded data 138 matches the specified product or process code of the plurality of product or process codes 140, the decoded data 138 to provide the full functionality 128 of the system 130 associated with the code 104. For the example of the product 124 that may include a vessel, such as a dissolution vessel, the decoded data 138 may include a specific serial number of the product 124 that matches the specified product or process code, where a match may be used as an indicator to provide a remainder of the decoded data 138 that includes step-by-step instructions that are specific to the system 130, and/or a type and/or size of the dissolution vessel for performing a specific type of dissolution test. Similarly, the match may be used as an indicator to provide a further code and/or password to permit a specific operational capability of the system 130, for example, by unlocking a specific functionality of the system 130.

According to examples disclosed herein, the code 104 may include a finder pattern 142 that is utilized to locate the code 104. In this regard, the specified trademark 120 may be located within the finder pattern 142 or encoded data 136 of the code 104. For the specified trademark 120 located within the finder pattern 142 or encoded data 136 of the code 104, the specified trademark 120 may include a color that is different from a color of the encoded data 136 of the code 104.

According to examples disclosed herein, the code authenticator 118 may analyze, from the recognizer 108, the text 112 and/or the at least one image 116 to determine whether the code 104 includes the specified trademark 120 by comparing the text 112 and/or the at least one image 116 in the code 104 to authentication data 144. The code authenticator 118 may determine, based on a determination that the text 112 and/or the at least one image 116 in the code 104 matches the authentication data 144, that the code 104 includes the specified trademark 120. For the example of the product 124 that may include a vessel, such as a dissolution vessel, the specified trademark 120 may include a word mark "ABCD" that may be compared to authentication data 144 that may include a plurality of word marks. Similarly, for the example of the product 124 that may include a vessel, such as a dissolution vessel, the specified trademark 120 may include a logo that may be compared to authentication data 144 that may include a plurality of logos.

According to examples disclosed herein, the scanner 102 may scan the code 104 to generate the scanned code 106 by receiving an indication of a known location 146 of the code 104. In this regard, the scanner 102 may scan, at the known location 146 of the code 104, the code 104 to generate the scanned code 106. For the example of the product 124 that may include a vessel, such as a dissolution vessel, the known location 146 of the code 104 may include a specified distance of the code 104 from a structural element of the dissolution vessel.

Operation of the apparatus 100 is described in further detail with reference to FIGS. 1-6.

Figure 2:
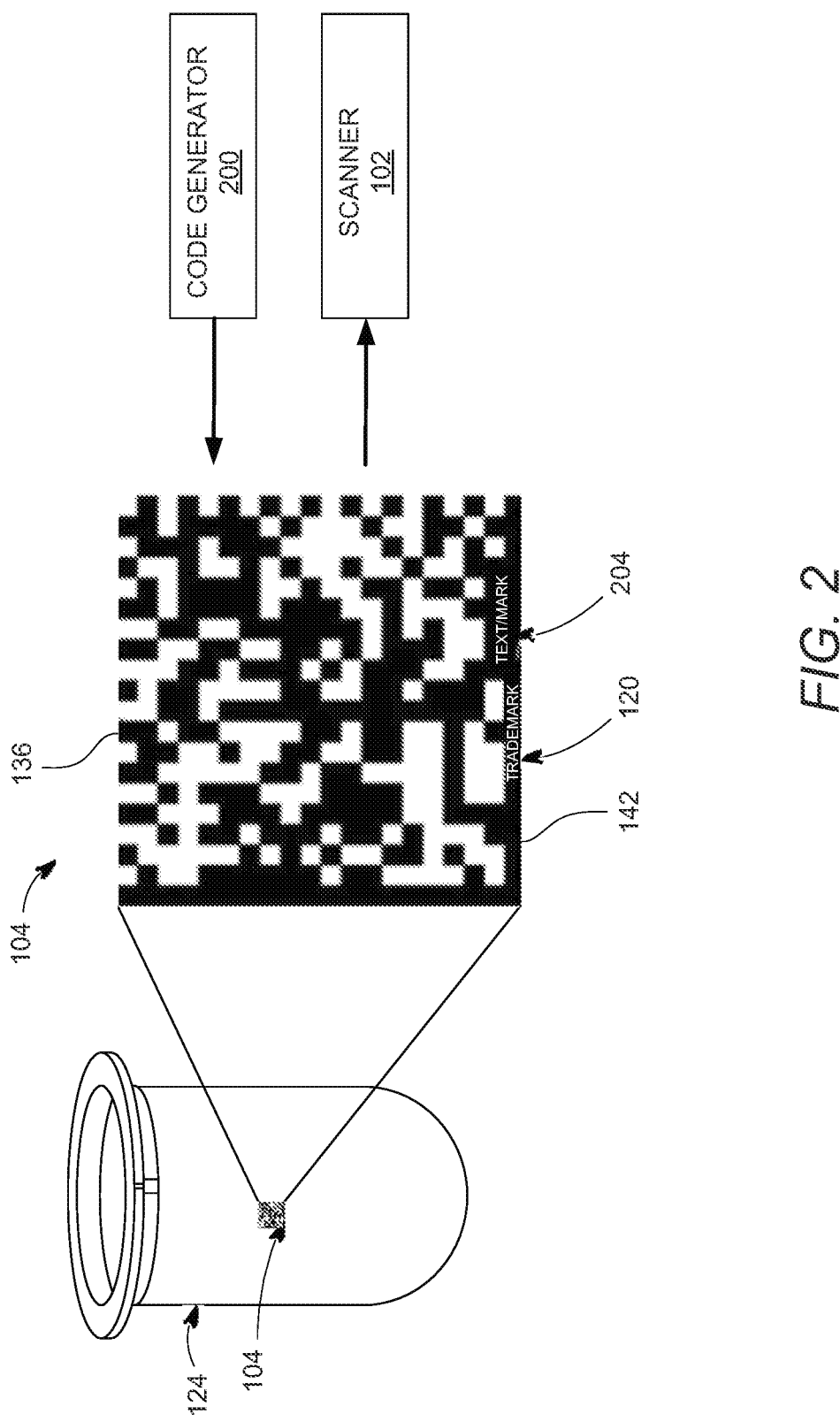
FIG. 2 illustrates an operational layout of the apparatus of FIG. 1, with respect to code generation and scanning, in accordance with an example of the present disclosure.

FIG. 2 illustrates an operational layout of the apparatus 100, with respect to code generation and scanning, in accordance with an example of the present disclosure.

Referring to FIGS. 1 and 2, and particularly FIG. 2, in some examples, the apparatus 100 may include (or otherwise utilize) a code generator 200 to generate the code 104 provided with a predetermined code area, and the scanner 102 to read the code 104. The code 104 may include cells that may be units that include information, such as the encoded data 136. The cells of the code 104 may be arranged in the code area. The code generator 200 may be configured by the apparatus 100. The apparatus 100 may further include a printing unit to print the code 104 generated by the code generator 200.

The code 104 may be a code such as a data matrix code (DMC), a quick response (QR) code, or another type of code. In some examples, the code may include the finder pattern 142. The finder pattern 142 may be used by the scanner 102 to locate the code 104 and the specified trademark 120. The trademark 120 may be located within a portion of the finder pattern 142 as shown in FIG. 2, and/or within the encoded data 136. The code 104 may also include further texts or marks 204, which may be recognized by the recognizer 108. In some examples, the specified trademark 120, the encoded data 136, and/or the further texts or marks 204 may be utilized by the code authenticator 118 and/or by the system functionality controller 126 to control the full functionality 128 or the different functionality 134 of the system 130. In this regard, the further texts or marks 204 may be authenticated in a similar manner as the specified trademark 120 to control the full functionality 128 or the different functionality 134 of the system 130.

Figure 3:
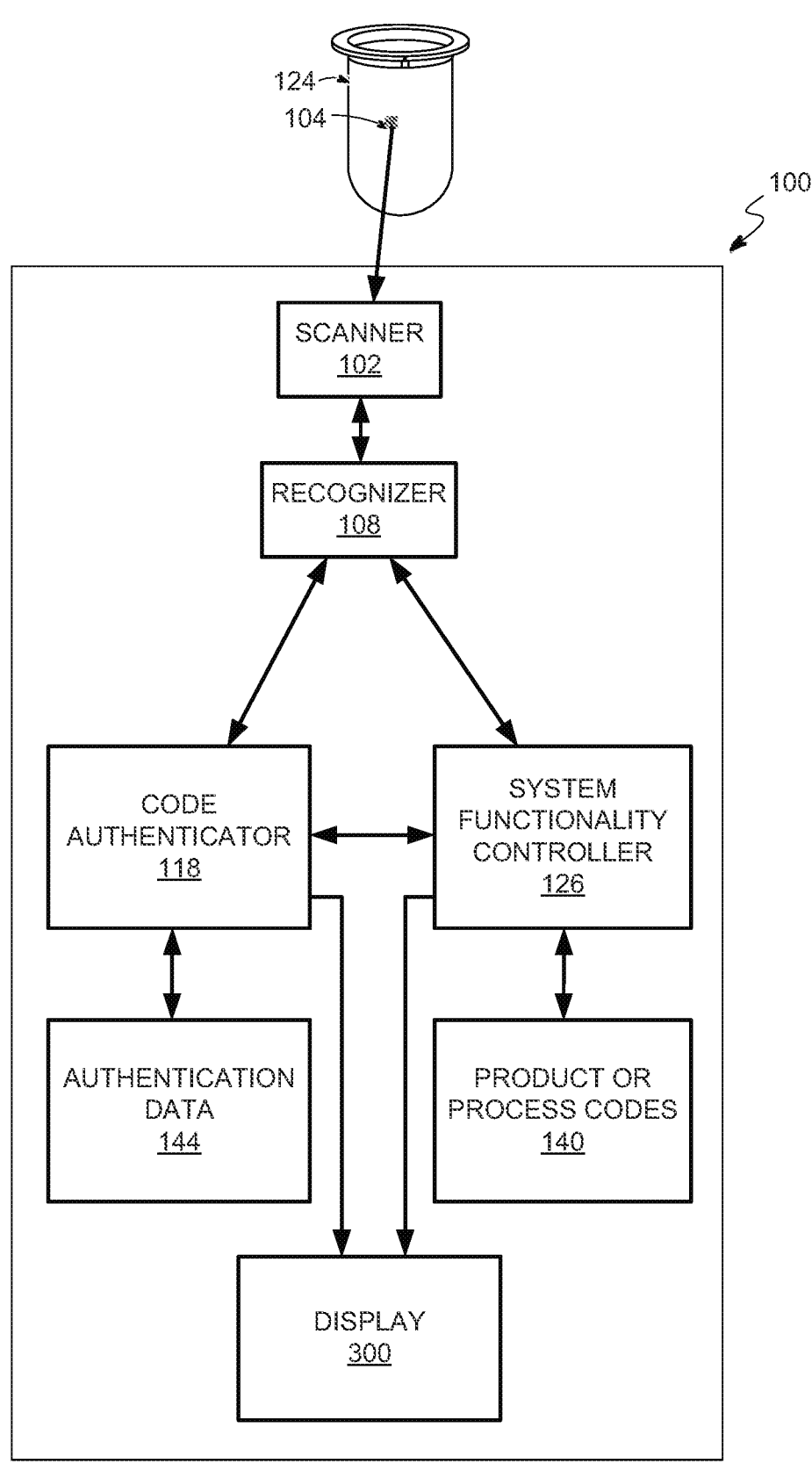
FIG. 3 illustrates a communication layout of certain components of the apparatus of FIG. 1, in accordance with an example of the present disclosure.

FIG. 3 illustrates a communication layout of certain components of the apparatus 100, in accordance with an example of the present disclosure.

Referring to FIGS. 1-3, and particularly FIG. 3, the scanner 102 may scan the code 104, which may include the specified trademark 120, the encoded data 136, and any further texts or marks 204. The scanner 102 may communicate with the recognizer 108 that decodes or decrypts the information from the code 104. For example, the recognizer 108, which may be the character recognizer 110, may read text 112 in the scanned code 106, for example, by OCR. Alternatively or additionally, the recognizer 108 may be the image recognizer 114 to recognize at least one image 116 in the scanned code 106. When text and/or an image is present within or proximate to the code 104, the text and/or image may be compared to the authentication data 144 to validate the place of origin of the consumer product 124. In this regard, the recognizer 108 may communicate with the code authenticator 118 that may analyze, from the recognizer 108, the text 112 and/or the at least one image 116 to determine whether the code 104 includes the specified trademark 120 by comparing the text 112 and/or the at least one image 116 in the code 104 to authentication data 144 stored in a database. The code authenticator 118 may determine, based on a determination that the text 112 and/or the at least one image 116 in the code 104 matches the authentication data 144, that the code 104 includes the specified trademark 120.

Further, the recognizer 108 may communicate with the system functionality controller 126 that may communicate with a database that includes the plurality of product or process codes 140. The system functionality controller 126 may determine whether the decoded data 138 matches a specified product or process code of the plurality of product or process codes 140. The system functionality controller 126 may transmit or display, based on a determination that the decoded data 138 matches the specified product or process code of the plurality of product or process codes 140, the decoded data 138 to provide the full functionality 128 of the system 130 associated with the code 104.

The scanner 102 may include any type of photographic device (e.g., a camera) that includes sufficient resolution to capture all of the encoded data 136, as well as any trademark 120, and any further texts or marks 204 included in or proximate to an area of the code 104. The scanner 102 may feed this captured information to the recognizer 108.

The code authenticator 118 and the system functionality controller 126 may communicate with a display 300. In this regard, for an example of operation of the display 300, the display 300 may be used to display the specified trademark 120. In another example, the display 300 may display whether the system 130 will run through its full functionality or different/limited functionality. In one example, if the system 130 has determined that it should run with limited functionality, the display 300 may display the missing functionalities. In one example, if the user wants the benefit of the full functionality of the system 130, the display 300 may provide the user an option to order a genuine manufacturer's product (e.g., as opposed to a product that does not include the specified trademark 120, or the decoded code is not a company product or process code, etc.). In an example, the display 300 may provide a statement such as, "to have full functionality of the system, please click the YES button." The user, by clicking the button, allows the system 130 to automatically order a genuine product that includes the specified trademark 120 and/or a code 104 that matches a company product or process code 140, for the scanner 102 to recognize and allow the user to have access to the full functionality of the system 130.

Further, the display 300 may display, for the system functionality controller 126, the decoded data 138 to provide the full functionality 128 of the system 130 associated with the code 104. The display 300 may be any suitable device capable of displaying textual or graphic messages. In some examples, the display 300 may be a display of a smart phone or another mobile device such as a computer, tablet, augmented reality (AR) glasses, etc. With respect to the AR glasses, the decoded data 138 may be displayed in addition to animated instructions to implement the step-by-step instructions as disclosed herein.

As disclosed herein, the system functionality controller 126 may authorize, based on the indication of authenticity 122 of the code 104, the full functionality 128 of the system 130 associated with the code 104 by decoding, based on the indication of authenticity 122 of the code 104, encoded data 136 from the code 104 to generate decoded data 138. In this regard, a decoder of the system functionality controller 126 may be any suitable device, application, or algorithm that may convert the encoded data 136 into an encrypted data string. The encrypted data string may be transformed, based on application of a decryption algorithm, into a decrypted data string. The decrypted data string may be parsed into discrete data elements, which may represent the decoded data 138. The decoded data 138 may include, for example, unique identifiers and information, such as serial numbers, as well as step-by-step instructions associated with the system 130 and/or the product 124 that were encrypted and encoded onto the code 104.

As disclosed herein, the scanner 102 may scan the code 104 to generate the scanned code 106 by receiving an indication of a known location 146 of the code 104. In this regard, the scanner 102 may scan, at the known location 146 of the code 104, the code 104 to generate the scanned code 106. In this regard, the presence of the code 104 at the precise known location may be used as an indicator of authenticity of the product 124. For example, if the code 104 is not present at the location 146, this lack of presence may be used as an indicator that the product 124 is not authentic.

Figure 4:
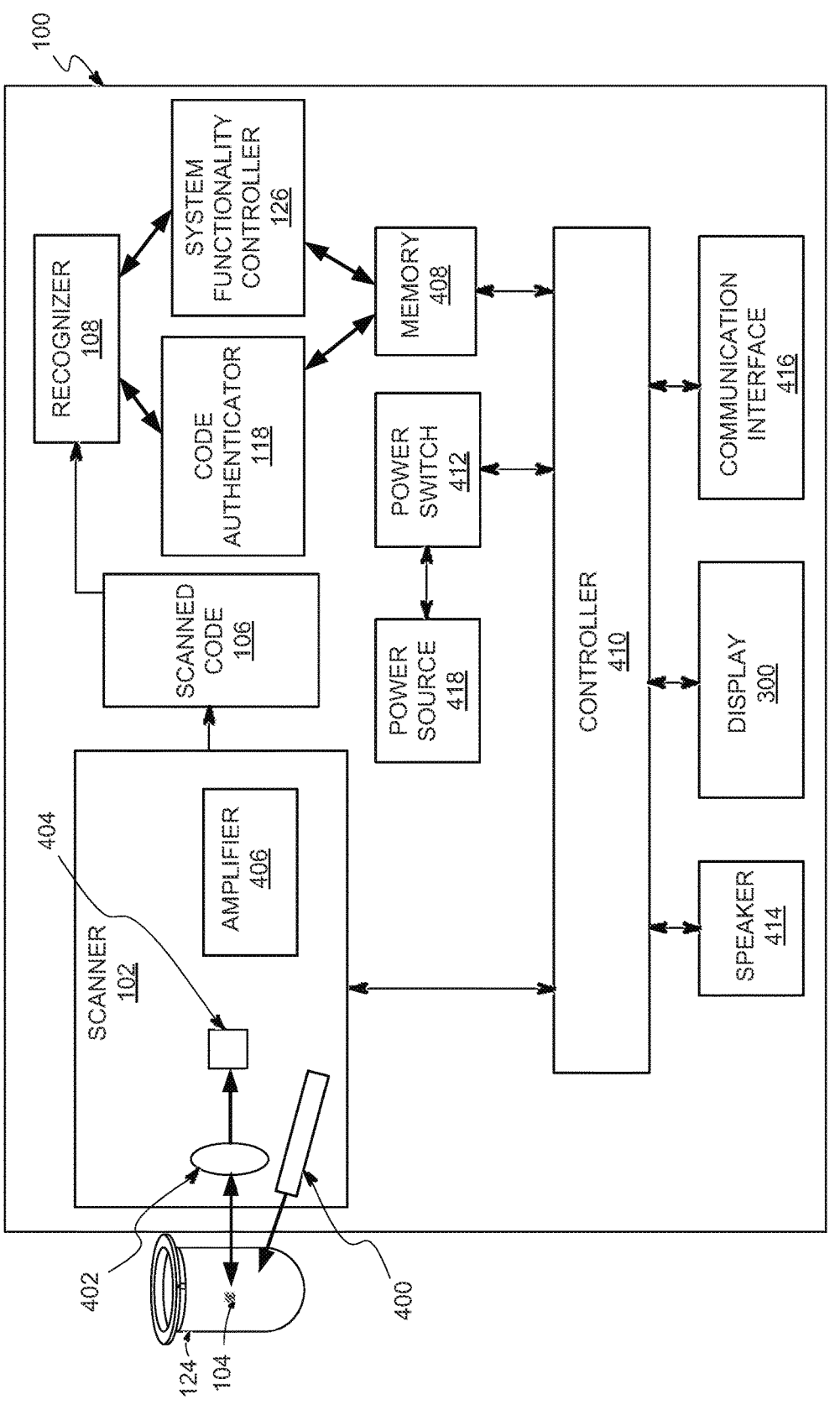
FIG. 4 illustrates a hardware layout of certain components of the apparatus of FIG. 1, in accordance with an example of the present disclosure.

FIG. 4 illustrates a hardware layout of certain components of the apparatus 100, in accordance with an example of the present disclosure.

Referring to FIGS. 1-4, and particularly FIG. 4, the scanner 102 may include an optical system that may include components for illuminating the product 124 and/or the code 104. For example, the scanner 102 may include a light source 400 to illuminate the product 124 and/or the code 104. The light source 400 may include a single or multiple light sources to illuminate the product 124 and/or the code 104.

The scanner 102 may further include a lens 402 to focus light received from the product 124 and/or the code 104, and a sensor 404 to image the product 124 and/or the code 104. In this regard, the sensor 404 may receive light that is reflected by the product 124 and/or the code 104 due to the illumination of the product 124 and/or the code 104 by the light source 400. The sensor 404 may include, for example, a charge coupled device (CCD) image sensor, a complementary metal oxide semiconductor (CMOS) image sensor, or another such image sensor that may be utilized to digitally capture an image of the code 104.

The analog signal for the image of the code 104 may be amplified by an amplifier 406, and utilized by the scanner 102 to generate the scanned code 106. In this regard, an analog to digital (A/D) converter (not shown) may convert the amplified analog signal to a digital signal for analysis by the recognizer 108.

The recognizer 108, as disclosed herein, may implement, for example, OCR and other types of image recognition technologies to respectively read the text 112 in the scanned code 106 and recognize the at least one image 116 in the scanned code 106. The code authenticator 118, as disclosed herein, may generate, based on a determination that the code 104 includes the specified trademark 120, an indication of authenticity 122 of the code 104. The system functionality controller 126, as disclosed herein, may authorize, based on the indication of authenticity 122 of the code 104, full functionality 128 of the system 130 associated with the code 104, or authorize, based on the indication of inauthenticity 132 of the code 104, different functionality 134 of the system 130 associated with the code 104.

The code authenticator 118, as disclosed herein, may analyze, from the recognizer 108, the text 112 and/or the at least one image 116 to determine whether the code 104 includes the specified trademark 120 by comparing the text 112 and/or the at least one image 116 in the code 104 to authentication data 144 stored in a database in memory 408. Similarly, the memory 408 may include the plurality of product or process codes 140 that may be utilized by the system functionality controller 126 as disclosed herein.

A controller 410 may control all functionality of the apparatus 100, including the aforementioned components that include the scanner 102, the amplifier 406, the recognizer 108, the code authenticator 118, and the system functionality controller 126. The controller 410 may also control operations of other components of the apparatus, such as a power switch 412, a speaker 414, the display 300, and a communication interface 416. For example, the controller 410 may control the power switch 412 to control on/off operations of the apparatus 100 and/or components of the apparatus 100. In this regard, the apparatus 100 may include a power source 418 to provide power to the various components of the apparatus 100. The speaker 414 may be utilized for the sound alert as disclosed herein for the indication of inauthenticity 132 of the product 124. Similarly, the display 300 may utilized for the visual alert as disclosed herein for the indication of authenticity 122, the indication of full functionality 128, the indication of inauthenticity 132, and the indication of different functionality 134, etc., related to the code 104. The communication interface 416 may be utilized for communication to and from external devices via wire or wireless communication, for example, to relay information such as the indication of authenticity 122, the indication of full functionality 128, the indication of inauthenticity 132, and the indication of different functionality 134, etc., related to the code 104.

Figure 5:
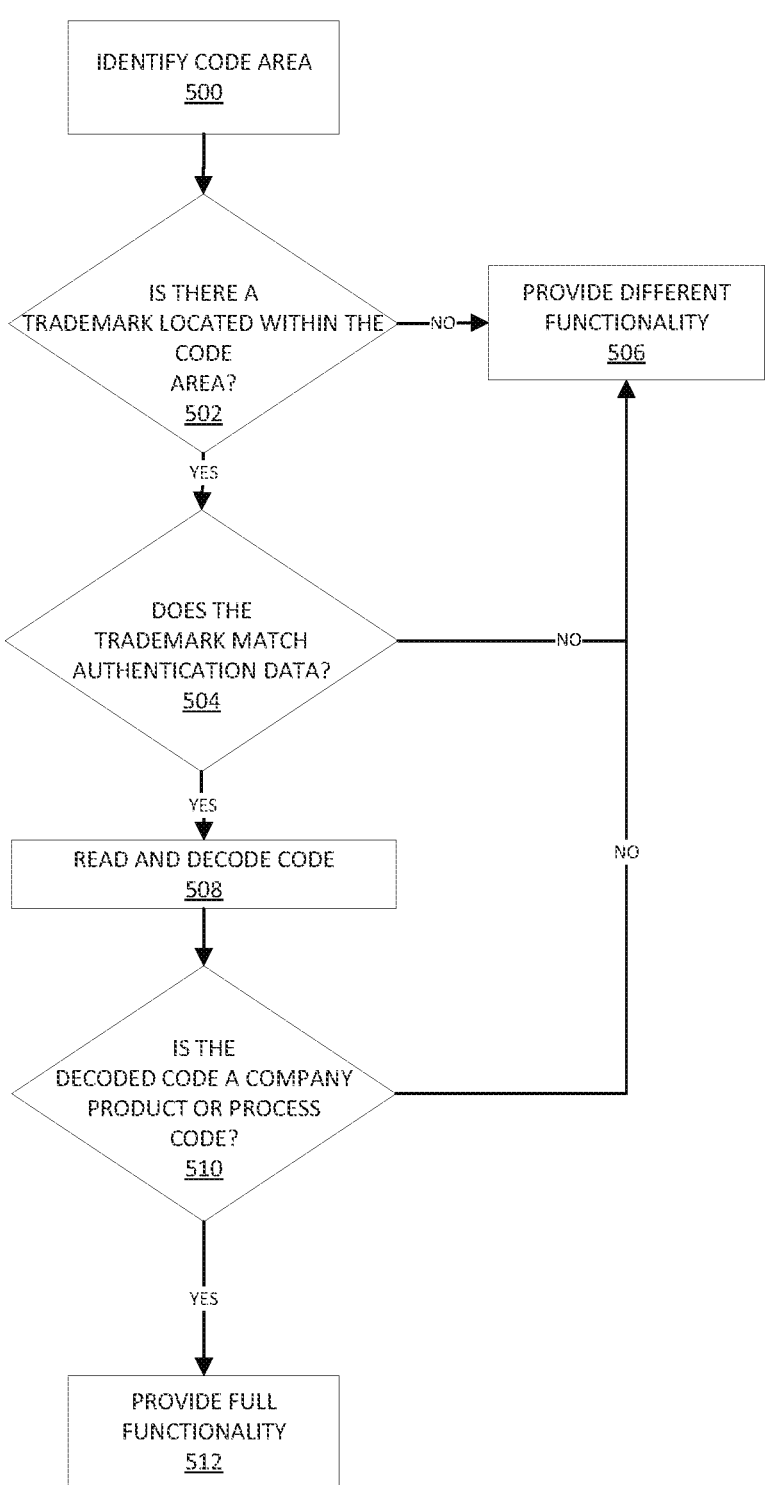
FIG. 5 illustrates a logical flow associated with operation of the apparatus of FIG. 1, in accordance with an example of the present disclosure.

FIG. 5 illustrates a logical flow associated with operation of the apparatus 100, in accordance with an example of the present disclosure.

Referring to FIGS. 1 and 5, at block 500, the code 104 may be identified in the associated code area to generate, by the scanner 102, the scanned code 106.

At block 502, the code authenticator 118 may analyze, from the recognizer 108, the text 112 and/or the at least one image 116 to determine whether the code 104 (e.g., the code area) includes a specified trademark 120.

Based on a determination at block 502 that the code 104 includes the specified trademark 120, at block 504, the code authenticator 118 may compare the text 112 and/or the at least one image 116 in the code 104 to authentication data 144. The code authenticator 118 may determine, based on a determination that the text 112 and/or the at least one image 116 in the code 104 matches the authentication data 144, that the code 104 includes the specified trademark 120.

Based on a determination at block 502 that the code 104 does not include the specified trademark 120, at block 506, the system functionality controller 126 may authorize different functionality 134 of the system 130 associated with the code 104.

Based on a determination at block 504 that the code 104 includes the specified trademark 120, at block 508, the system functionality controller 126 may decode encoded data 136 from the code 104 to generate decoded data 138.

At block 510, the system functionality controller 126 may determine whether the decoded data 138 matches a specified product or process code of a plurality of product or process codes 140.

Based on a determination at block 510 that the decoded data 138 matches the specified product or process code of the plurality of product or process codes 140, at block 512, the system functionality controller 126 may transmit or display the decoded data 138 to provide the full functionality 128 of the system 130 associated with the code 104.

Alternatively, based on a determination at block 510 that the decoded data 138 does not match the specified product or process code of the plurality of product or process codes 140, at block 506, the system functionality controller 126 may authorize different functionality 134 of the system 130 associated with the code 104.

Figure 6:
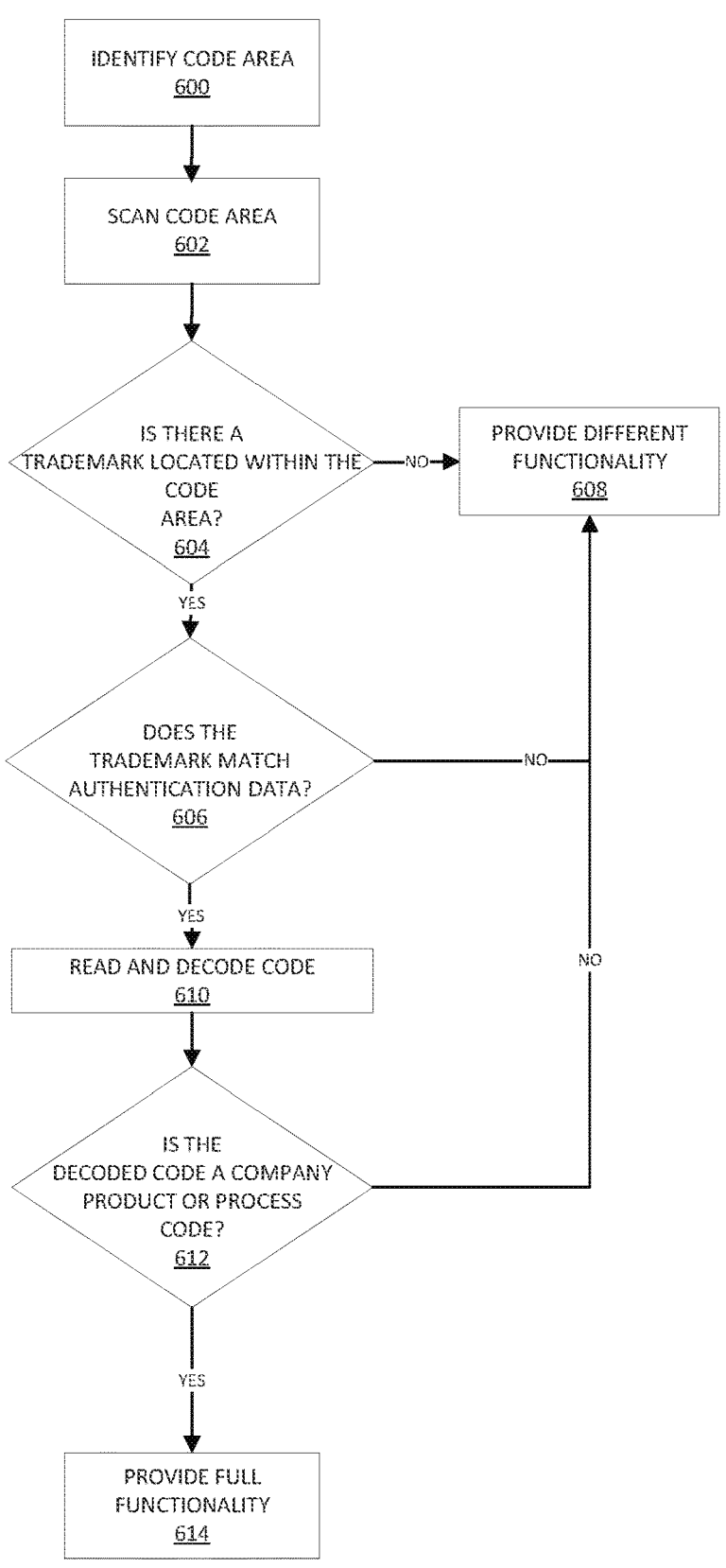
FIG. 6 illustrates another logical flow associated with operation of the apparatus of FIG. 1, in accordance with an example of the present disclosure.

FIG. 6 illustrates another logical flow associated with operation of the apparatus 100, in accordance with an example of the present disclosure.

Referring to FIGS. 1 and 6, at block 600, the code 104 may be identified in the associated code area.

At block 604, the code authenticator 118 may analyze, from the recognizer 108, the text 112 and/or the at least one image 116 to determine whether the code 104 (e.g., the code area) includes a specified trademark 120.

Based on a determination at block 604 that the code 104 includes the specified trademark 120, at block 606, the code authenticator 118 may compare the text 112 and/or the at least one image 116 in the code 104 to authentication data 144. The code authenticator 118 may determine, based on a determination that the text 112 and/or the at least one image 116 in the code 104 matches the authentication data 144, that the code 104 includes the specified trademark 120.

Based on a determination at block 604 that the code 104 does not include the specified trademark 120, at block 608, the system functionality controller 126 may authorize different functionality 134 of the system 130 associated with the code 104.

Based on a determination at block 606 that the code 104 includes the specified trademark 120, at block 610, the system functionality controller 126 may decode encoded data 136 from the code 104 to generate decoded data 138.

At block 612, the system functionality controller 126 may determine whether the decoded data 138 matches a specified product or process code of a plurality of product or process codes 140.

Based on a determination at block 612 that the decoded data 138 matches the specified product or process code of the plurality of product or process codes 140, at block 614, the system functionality controller 126 may transmit or display the decoded data 138 to provide the full functionality 128 of the system 130 associated with the code 104.

Alternatively, based on a determination at block 612 that the decoded data 138 does not match the specified product or process code of the plurality of product or process codes 140, at block 608, the system functionality controller 126 may authorize different functionality 134 of the system 130 associated with the code 104.

Figure 7:
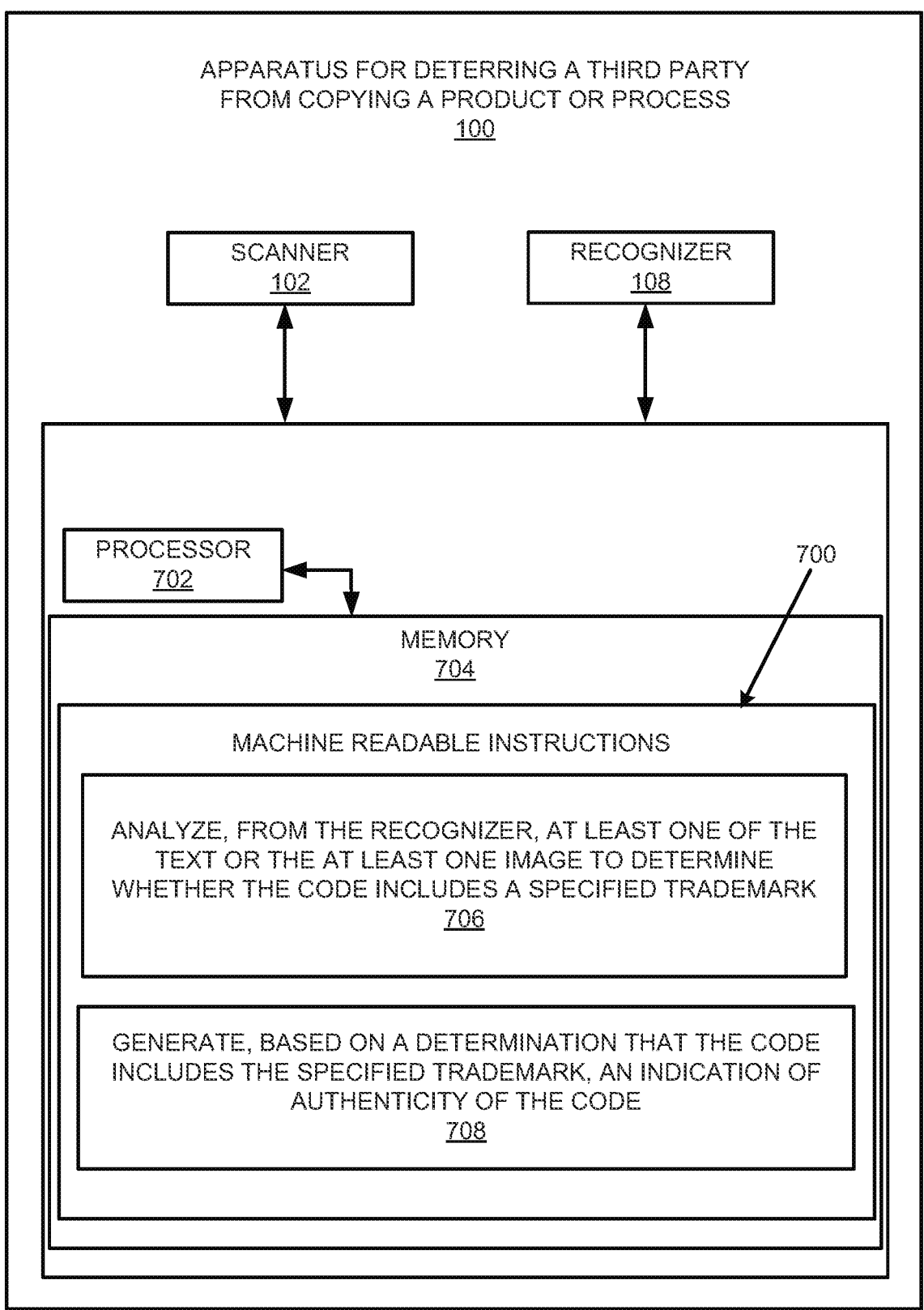
FIG. 7 illustrates an example block diagram for deterring a third party from copying a product or process, in accordance with an example of the present disclosure.
Figure 9:
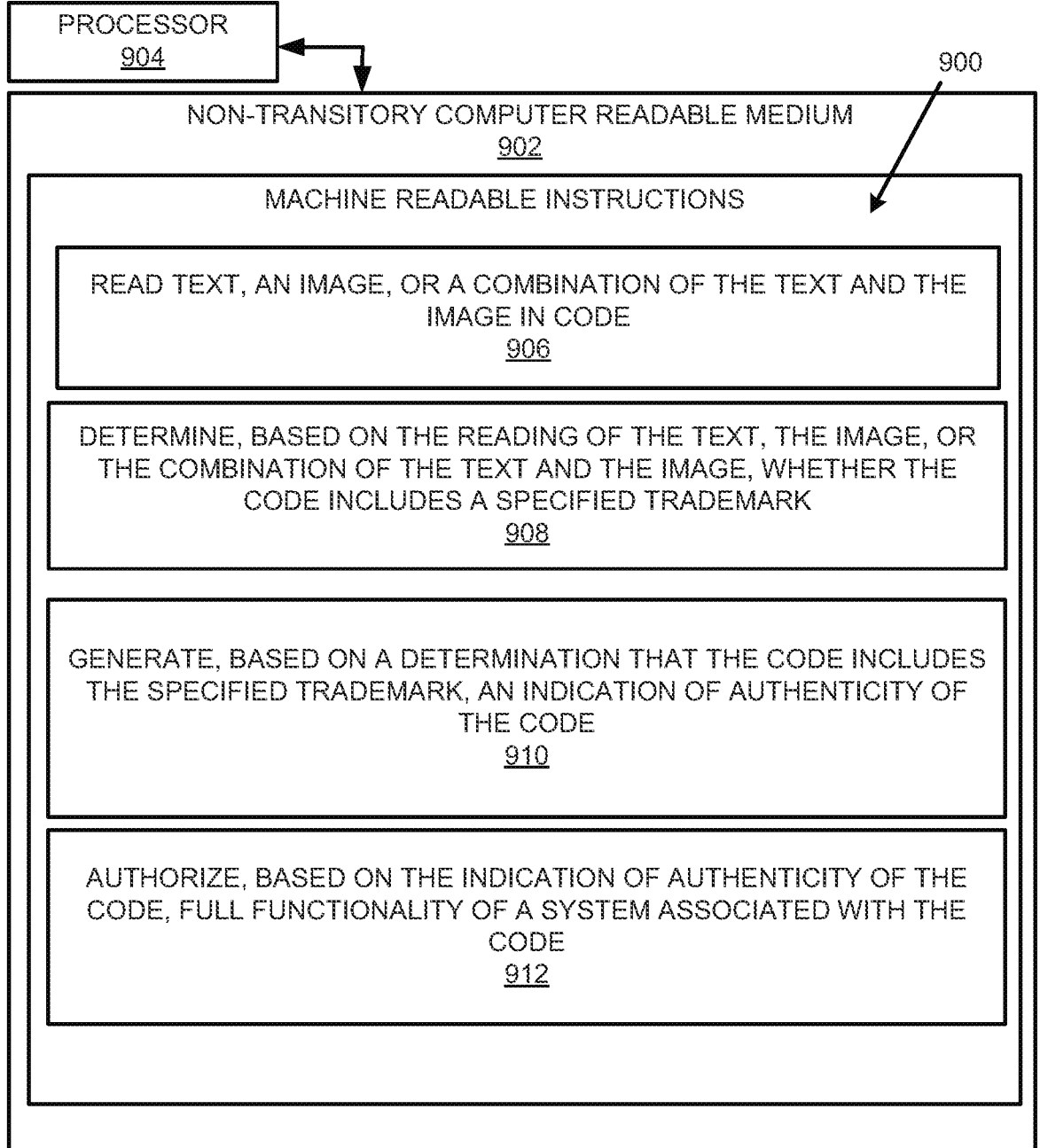
FIG. 9 illustrates another example block diagram for deterring a third party from copying a product or process, in accordance with another example of the present disclosure.

FIGS. 7-10 respectively illustrate an example block diagram 700, a flowchart of an example method 800, and further example block diagrams 900 and 1000 for deterring a third party from copying a product or process, according to examples. The block diagram 700, the method 800, and the block diagrams 900 and 1000 may be implemented on the apparatus 100 described above with reference to FIG. 1 by way of example and not of limitation. The block diagram 700, the method 800, and the block diagrams 900 and 1000 may be practiced in other apparatus. In addition to showing the block diagram 700, FIG. 7 shows hardware of the apparatus 100 that may execute the instructions of the block diagram 700. The hardware may include a processor 702, and a memory 704 storing machine readable instructions that when executed by the processor cause the processor to perform the instructions of the block diagram 700. The memory 704 may represent a non-transitory computer readable medium. FIG. 8 may represent an example method for deterring a third party from copying a product or process, and the steps of the method. FIGS. 9 and 10 may respectively represent a non-transitory computer readable medium 902 and a non-transitory computer readable medium 1002 having stored thereon machine readable instructions to deter a third party from copying a product or process according to an example. The machine readable instructions, when executed, cause a processor 904 (or 1004) to perform the instructions of the block diagram 900 (or 1000) also shown in FIG. 9 (or FIG. 10).

The processor 702 of FIG. 7, the processor 904 of FIG. 9, and/or the processor 1004 of FIG. 10 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 902 of FIG. 9 or the non-transitory computer readable medium 1002 of FIG. 10), such as hardware storage devices (e.g., RAM (random access memory), ROM (read only memory), EPROM (erasable, programmable ROM), EEPROM (electrically erasable, programmable ROM), hard drives, and flash memory). The memory 704 may include a RAM, where the machine readable instructions and data for a processor may reside during runtime.

Referring to FIGS. 1-7, and particularly to the block diagram 700 shown in FIG. 7, the memory 704 may include instructions 706 to analyze, from the recognizer 108, the text 112 and/or the at least one image 116 to determine whether the code 104 includes a specified trademark 120.

The processor 702 may fetch, decode, and execute the instructions 708 to generate, based on a determination that the code 104 includes the specified trademark 120, an indication of authenticity 122 of the code 104.

Referring to FIGS. 1-6 and 8, and particularly FIG. 8, for the method 800, at block 802, the method may include analyzing, by at least one hardware processor, for the code 104, text 112, an image 116, or a combination of the text 112 and the image 116, to determine whether the code 104 includes a specified trademark 120, and/or whether the code 104 is located at a specified location (e.g., the location 146).

At block 804, the method may include generating, by the at least one hardware processor, based on a determination that the code 104 includes the specified trademark 120 and/or the code 104 is located at the specified location (e.g., the location 146), an indication of authenticity 122 of the code 104.

According to examples disclosed herein, the specified trademark 120 may include a specified trade name 148 and/or a specified logo 150.

According to examples disclosed herein, the specified location (e.g., the location 146) may include an expected location of the code 104 on the product 124.

According to examples disclosed herein, the method 800 may further include authorizing, by the at least one hardware processor, based on the indication of authenticity 122 of the code 104, full functionality 128 of the system 130 associated with the code 104.

According to examples disclosed herein, the method 800 may further include generating, by the at least one hardware processor, based on a determination that the code 104 does not include the specified trademark 120 and/or the code 104 is not located at the specified location (e.g., the location 146), an indication of inauthenticity 132 of the code 104. Further, the method 800 may include authorizing, by the at least one hardware processor, based on the indication of inauthenticity 132 of the code 104, reduced functionality or no functionality of the system 130 associated with the code 104.

According to examples disclosed herein, the method 800 may further include decoding, by the at least one hardware processor, based on the indication of authenticity 122 of the code 104, encoded data 136 from the code 104 to generate decoded data 138, and transmitting and/or displaying, by the at least one hardware processor, the decoded data 138 to provide the full functionality 128 of the system 130 associated with the code 104.

Referring to FIGS. 1-6 and 9, and particularly FIG. 9, for the block diagram 900, the non-transitory computer readable medium 902 may include instructions 906 to read text 112, an image 116, or a combination of the text 112 and the image 116 in code 104.

The processor 904 may include instructions 908 to determine, based on the reading of the text 112, the image 116, or the combination of the text 112 and the image 116, whether the code 104 includes a specified trademark 120.

The processor 904 may include instructions 910 to generate, based on a determination that the code 104 includes the specified trademark 120, an indication of authenticity 122 of the code 104.

The processor 904 may include instructions 912 to authorize, based on the indication of authenticity 122 of the code 104, full functionality 128 of the system 130 associated with the code 104.

Referring to FIGS. 1-6 and 10, and particularly FIG. 10, for the block diagram 1000, the non-transitory computer readable medium 1002 may include instructions 1006 to detect an actionable item (e.g., the trademark 120) on an object (e.g., the product 124 or another type of object) that is used with a system (e.g., a hand-held device, a remote computer, a machine, etc.) encompassing the non-transitory computer readable medium 1002.

The processor 1004 may include instructions 1008 to determine whether the detected actionable item on the object is authentic.

The processor 1004 may include instructions 1010 to unlock, if authentic, all functionality of the system 130 and if not authentic, lock at least one functionality of the system 130.

According to examples disclosed herein, the authenticity of the actionable item may be determined by (i) position of the actionable item on the object (e.g., the product 124), (ii) quality of the actionable item on the object (e.g., the product 124), (iii) dimensions or size of the actionable item, (iv) or a combination thereof. In one example, the actionable item may include a trademark.

According to examples disclosed herein, processor 1004 may include instructions to generate a display of the at least one locked functionality of the system 130. The processor 1004 may include instructions to generate a query to unlock the at least one locked functionality of the system, where the query may include an action to be performed to unlock the at least one locked functionality of the system 130 (e.g., "to have full functionality of the system, please click the YES button"). Further, in response to confirmation of performance of the action (e.g., clicking on a button to automatically order a genuine product), the processor 1004 may include instructions to unlock the at least one locked functionality of the system.

According to examples disclosed herein, the action may include purchase of a genuine object associated with the actionable item.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

13

What is claimed is:

1. An authentication apparatus comprising:

at least one hardware processor;

a scanner, executed by the at least one hardware processor, to scan code to generate scanned code, wherein the code includes information associated with a product or a process operationally used with a system;

a recognizer being one of:

(i) a character recognizer, executed by the at least one hardware processor, to read text in the scanned code;

(ii) an image recognizer, executed by the at least one hardware processor, to recognize at least one image in the scanned code; or (iii) the character recognizer and the image recognizer; and a code authenticator, executed by the at least one hardware processor, to:

analyze, from the recognizer, at least one of the text or the at least one image to determine whether the code includes a specified trademark;

generate, based on a determination that the code includes the specified trademark, an indication of authenticity of the code; and a system functionality controller, executed by the at least one hardware processor, to:

authorize, based on the indication of authenticity of the code, full operational functionality of the system.

2. The authentication apparatus according to claim 1, wherein the specified trademark includes at least one of a specified trade name or a specified logo.

3. The authentication apparatus according to claim 1, wherein the code authenticator is further executed by the at least one hardware processor to:

generate, based on a determination that the code does not include the specified trademark, an indication of inauthenticity of the code, wherein the system functionality controller is further executed by the at least one hardware processor to:

authorize, based on the indication of inauthenticity of the code, different functionality of the system associated with the code.

4. The authentication apparatus according to claim 3, wherein the different functionality includes reduced functionality or no functionality.

5. The authentication apparatus according to claim 1, wherein the code authenticator is further executed by the at least one hardware processor to:

generate, based on a determination that the code does not include the specified trademark, an indication of inauthenticity of the code, wherein the indication of inauthenticity includes at least one of a sound or a visual alert.

6. The authentication apparatus according to claim 1, wherein the system functionality controller is further executed by the at least one hardware processor to authorize, based on the indication of authenticity of the code, the full operational functionality of the system associated with the code by:

decoding, based on the indication of authenticity of the code, encoded data from the code to generate decoded data; and at least one of transmitting or displaying the decoded data to provide the full operational functionality of the system associated with the code.

7. The authentication apparatus according to claim 1, wherein the system functionality controller is further executed by the at least one hardware processor to authorize, based on the indication of authenticity of the code, the full operational functionality of the system associated with the code by:

decoding, based on the indication of authenticity of the code, encoded data from the code to generate decoded data;

determining whether the decoded data matches a specified product or process code of a plurality of product or process codes; and at least one of transmitting or displaying, based on a determination that the decoded data matches the specified product or process code of the plurality of product or process codes, the decoded data to provide the full operational functionality of the system associated with the code.

8. The authentication apparatus according to claim 1, wherein the code includes a finder pattern that is utilized to locate the code, and wherein the specified trademark is located within at least one of the finder pattern or encoded data of the code.

9. The authentication apparatus according to claim 1, wherein the specified trademark includes a color that is different from a color of encoded data of the code.

10. The authentication apparatus according to claim 1, wherein the code authenticator is further executed by the at least one hardware processor to analyze, from the recognizer, at least one of the text or the at least one image to determine whether the code includes the specified trademark by:

comparing at least one of the text or the at least one image in the code to authentication data; and determining, based on a determination that at least one of the text or the at least one image in the code matches the authentication data, that the code includes the specified trademark.

11. The authentication apparatus according to claim 1, wherein the scanner is to scan the code to generate the scanned code by:

receiving an indication of a known location on the product, wherein the known location represents a location of the code on the product; and scanning, at the known location of the code, the code to generate the scanned code.

12. A method comprising:

receiving, by at least one hardware processor, an indication of a specified location for code on a product, wherein the specified location represents a location of the code on the product;

analyzing, by the at least one hardware processor, for the code, text, an image, or a combination of the text and the image, to determine whether the code includes a specified trademark, and whether the code is located at the specified location; and generating, by the at least one hardware processor, based on a determination that the code includes the specified trademark and the code is located at the specified location, an indication of authenticity of the code.

13. The method according to claim 12, wherein the specified trademark includes at least one of a specified trade name or a specified logo.

14. The method according to claim 12, further comprising:

authorizing, by the at least one hardware processor, based on the indication of authenticity of the code, full functionality of a system associated with the code.

15. The method according to claim 14, further comprising:

generating, by the at least one hardware processor, based on a determination that the code at least one of does not include the specified trademark or the code is not located at the specified location, an indication of inauthenticity of the code; and authorizing, by the at least one hardware processor, based on the indication of inauthenticity of the code, reduced functionality or no functionality of the system associated with the code.

16. The method according to claim 14, wherein authorizing, by the at least one hardware processor, based on the indication of authenticity of the code, the full functionality of the system associated with the code, further comprises:

decoding, by the at least one hardware processor, based on the indication of authenticity of the code, encoded data from the code to generate decoded data; and at least one of transmitting or displaying, by the at least one hardware processor, the decoded data to provide the full functionality of the system associated with the code.

17. A non-transitory computer readable medium having stored thereon machine readable instructions that, when executed by at least one hardware processor, cause the at least one hardware processor to:

read text, an image, or a combination of the text and the image in code, wherein the code includes information associated with a product or a process operationally used with a system;

determine, based on the reading of the text, the image, or the combination of the text and the image, whether the code includes a specified trademark;

generate, based on a determination that the code includes the specified trademark, an indication of authenticity of the code; and authorize, based on the indication of authenticity of the code, full operational functionality of the system associated with the code.

18. A non-transitory computer readable medium having stored thereon machine readable instructions that, when executed by at least one hardware processor, cause the at least one hardware processor to:

detect an actionable item on an object that is used with a system encompassing the non-transitory computer readable medium;

determine whether the detected actionable item on the object is authentic; and if authentic, unlock all functionality of the system and if not authentic, lock at least one functionality of the system.

19. The non-transitory computer readable medium of claim 18, wherein the authenticity of the actionable item is determined by (i) position of the actionable item on the object, (ii) quality of the actionable item on the object, (iii) dimensions or size of the actionable item, (iv) or a combination thereof.

20. The non-transitory computer readable medium of claim 18, wherein the actionable item includes a trademark.

21. The non-transitory computer readable medium of claim 18, wherein the machine readable instructions to lock the at least one functionality of the system further comprise machine readable instructions that, when executed by the at least one hardware processor, further cause the at least one hardware processor to:

generate a display of the at least one locked functionality of the system;

generate a query to unlock the at least one locked functionality of the system, wherein the query includes an action to be performed to unlock the at least one locked functionality of the system; and in response to confirmation of performance of the action, unlock the at least one locked functionality of the system.

22. The non-transitory computer readable medium of claim 21, wherein the action includes purchase of a genuine object associated with the actionable item.

* * * * *